A. T. SULLIVAN.

ANIMAL TRAP.

No. 11,605. Reissued June 8, 1897.

WITNESSES

L. S. Elliott,

D. L. Rice

Alonzo T. Sullivan

INVENTOR

By Eugene W. Johnson his Attorney

THE NORRIS PETERS CO., PHOTO-LITHO., WASHINGTON, D. C.

UNITED STATES PATENT OFFICE.

ALONZO TAYLOR SULLIVAN, OF MALCOLM, NEBRASKA.

ANIMAL-TRAP.

SPECIFICATION forming part of Reissued Letters Patent No. 11,605, dated June 8, 1897.

Original No. 575,792, dated January 26, 1897. Application for reissue filed March 3, 1897. Serial No. 625,894.

*To all whom it may concern:*

Be it known that I, ALONZO TAYLOR SULLIVAN, a citizen of the United States, and a resident of Malcolm, in the county of Lancaster and State of Nebraska, have invented certain new and useful Improvements in Animal-Traps; and I do hereby declare the following is a full, clear, and exact description of the invention, that will enable others skilled in the art to which it appertains to make and use the same, reference being had to the accompanying drawings, and to the letters of reference marked thereon, which form a part of this specification.

This invention relates to improvements in animal-traps, the object of the invention being to supply an article of this character which is operative, simple in construction, inexpensive, durable, and in which the movable parts of the trap are positioned within the casing thereof and are carried by the wall in which an aperture is made, so that a single casing may include several traps, as is shown in the accompanying drawings.

The invention will be hereinafter fully described, and specifically set forth in the annexed claims.

Figure 1:
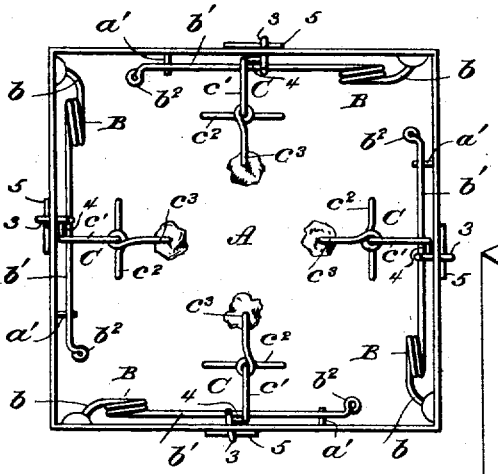
Figure 2:
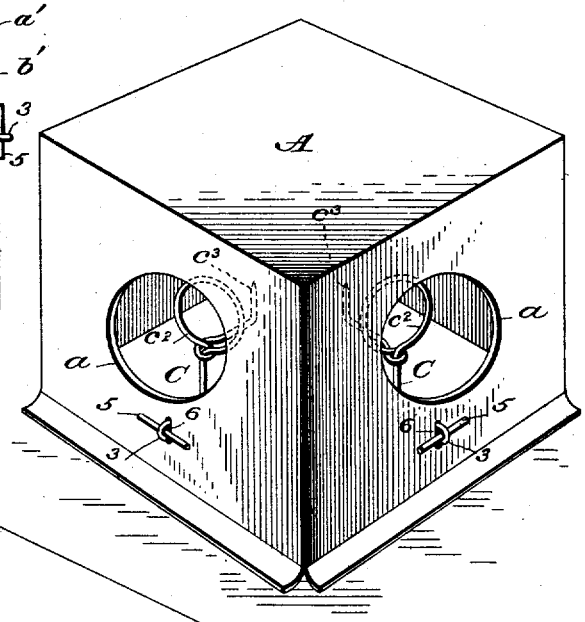
Figure 3:
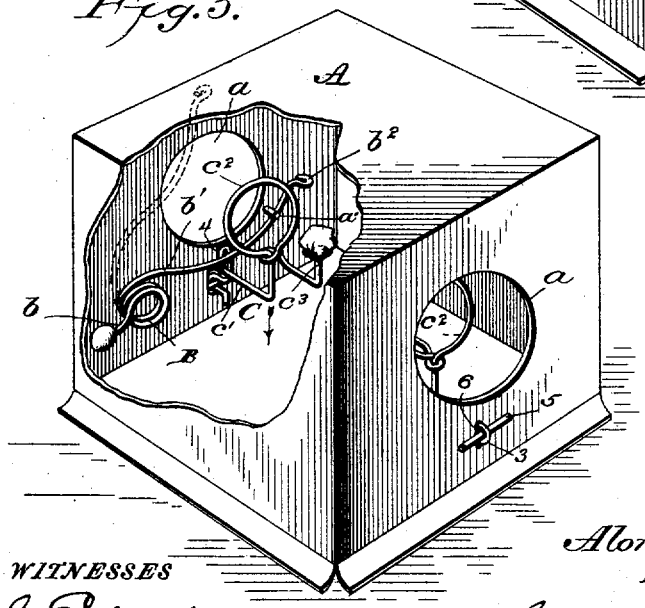

In the accompanying drawings, forming part of this specification, Figure 1 is an inverted plan view of my improved trap. Fig. 2 is a perspective view thereof, and Fig. 3 is a perspective view showing a portion of the walls or casing of the trap broken away.

In the practice of my invention I provide a hollow casing A, which may be of any desired shape, but which is preferably square and is composed of sheet metal. Through the walls of the said casing I provide apertures *a* as a means of ingress for the animal to be caught by the trap. Upon the inner walls of the said casing A, I attach the choker-arms, which embody a normally-expanded spiral-spring portion B, from which extends arms *b* and *b'*, the arms *b* being securely fastened to the walls by means of drops of solder. The arms *b'* being free will extend normally in an upward direction, as illustrated by dotted lines in Fig. 3. Projected inwardly from the free ends of the arms *b'* are looped portions $b^2$, adapted to be used as thumb-pieces in operating the choker-arms to set the same.

Pivotally attached to the walls of the casing beneath the openings or apertures *a* are trip-levers C, which levers comprise upright portions having loops or bends 3 and 4 forming part thereof, the loops 3 engaging with rods 5, which are secured to the outer walls of the casing, so as to intersect the aperture 6 in the side walls of the casing, the said loops 3 passing outwardly through said apertures, whereby the trip-levers are fulcrumed, so as to have a limited movement.

Projected from the loops 4 at right angles therewith is a member *c'*, bent to form upwardly-extended loops or rings $c^2$, and beyond the loops or rings the trip-levers have bait-hooks $c^3$, as shown. Projecting inwardly from the walls of the casing A are small pins *a'*, which are adapted to engage with the spring choker-arms when the trap is set.

In the operation of the device the arms *b'* of the spring are forced downwardly until they pass over the loop or return-bend 4 of the trip-lever C and under the pins *a'*, which project from the walls of the casing, as illustrated by full lines in Fig. 3 of the drawings, the bait having been previously placed on the hook.

After setting and baiting the trap it may be placed in any suitable location, and an animal in endeavoring to reach the bait will extend a portion of its body through one of the apertures *a* of the casing, which aperture is of a suitable diameter, but in order to reach the bait the animal would have to pass through the ring or closed loop $c^2$ of the trip-lever C, and as this ring or closed loop is of a smaller diameter than the aperture *a* in the casing it will prevent the animal's body from passing therethrough, and in endeavoring to reach the bait the animal will push the lever either in a downward direction, as indicated by the arrow on Fig. 3, or laterally to a sufficient degree to release the spring-arm, which will immediately spring up and tightly clamp the animal against the upper wall of the opening or aperture *a* and hold it there securely, the arms having sufficient spring force to choke the animal. When the trip-lever C is forced downward, the looped member 4 thereof will force the free end of the choker-arm off the pin, and when a lateral movement is imparted thereto one of the side members of the loop 4 will serve as a fulcrum for the other member and effect the same result.

In constructing the operative portions of my device I prefer to use bent wire, each part being made of a single piece in order to lessen the cost of manufacture, but I do not confine myself to the specific details of construction herein shown and described. The casing A may also be made of a single piece and the lower edges are flared outwardly, as shown, the function of such construction being to afford a wider base and angular edges which will catch upon the floor, especially when carpeted. It will also be noted that in setting the trap the casing is inverted, and when inverted the loop 4 of the fulcrumed trip-lever will bear against the wall of the casing below the aperture *a*, so that it will not be necessary to adjust said trip-lever prior to causing the choker-arm to engage with the retaining-pin. The construction permits several independent traps to be carried by a single casing, and the mechanism of each trap is carried by a wall having apertures, a pin, and a cross bar or rod, so there will be no interference of the mechanisms carried by one of the walls with that carried by the other walls.

Having thus described my invention, what I claim as new, and desire to secure by Letters Patent, is—

1. An animal-trap consisting of a casing having an aperture in one of the walls thereof, a spring-actuated choker-arm, one end of which is attached to the inner side of the wall of the casing, to one side of the aperture, a pin on the opposite side of the aperture, and a trip-lever fulcrumed below the aperture substantially as shown.

2. In an animal-trap the combination with a casing having apertures in the vertical walls thereof, of spring choker-arms attached to the inner walls, to one side of the apertures, and projecting pins carried by the walls to retain the choker-arms when in engagement therewith below the apertures; together with trip-levers, which are fulcrumed below the aforesaid apertures, and are so constructed that a downward or lateral movement thereof will release the choker-arm, substantially as shown.

3. In combination with the casing having in the walls thereof apertures *a*, and smaller apertures below the same, of rods which intersect the latter, trip-levers fulcrumed upon said rods, and provided below the fulcrum with depending ends and above the same with loops formed by a return-bend, rings or loops of less diameter than the larger apertures in the casing and bait-hooks beyond said rings or loops; together with a choking-arm, substantially as shown.

4. An animal-trap comprising a casing having apertures through the walls thereof, spring-pressed choking-arms upon the inner surface of said casing, inwardly-projecting pins adapted to be engaged by the said choking-arms, in combination with the trip-levers C, comprising upright portions having bends or loops 3, and 4, and rods 5, the said bends or loops 3, passing outwardly through the apertures 6, in the side walls of the casing whereby the trip-levers are fulcrumed and free to move to a limited extent.

5. In combination with an animal-trap constructed substantially as shown and embodying a casing with openings, and spring-actuated choker-arms, adapted when released to move toward the upper portions of the openings, of a trip-lever and bait-hook fulcrumed upon the casing and provided with a depending portion below the fulcrum, and above the same with a return-bend to provide vertical members which are parallel, one serving as a fulcrum by engaging with the wall of the casing when the trip-lever is moved laterally, an arm projecting from one member of the return-bend, said arm being bent to provide an upwardly-extending closed loop or ring, and a further extension and bend to provide a bait-hook as set forth.

In testimony that I claim the foregoing as my invention I have hereunto signed my name in the presence of two witnesses.

ALONZO TAYLOR SULLIVAN.

Witnesses:
B. D. HOTCHKISS,
W. J. KERR.